(12) United States Patent
Abzarian et al.

(10) Patent No.: US 10,133,430 B2
(45) Date of Patent: Nov. 20, 2018

(54) ENCODING DATA IN CAPACITIVE TAGS (71) Applicant: Microsoft Technology Licensing, LLC, Redmond, WA (US)

(72) Inventors: David Abzarian, Kenmore, WA (US); Austin Bradley Hodges, Seattle, WA (US); Connor Weins, Seattle, WA (US); Fei Su, Issaquah, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 127 days.

(21) Appl. No.: 15/152,451

(22) Filed: May 11, 2016

(65) Prior Publication Data

US 2017/0329433 A1 Nov. 16, 2017

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
USPC .................................................. 345/173–174
See application file for complete search history.

(56) References Cited

U.S. PATENT DOCUMENTS

| 2004/0214642 | A1 | 10/2004 | Beck |
| 2009/0273580 | A1 | 11/2009 | Ota et al. |
| 2011/0279409 | A1* | 11/2011 | Salaverry ............. G06F 3/0416 345/174 |
| 2013/0106722 | A1* | 5/2013 | Shahparnia ......... G06F 3/03545 345/173 |
| 2013/0113729 | A1 | 5/2013 | Chiang |
| 2013/0207938 | A1* | 8/2013 | Ryshtun ............... G06F 3/0416 345/179 |
| 2013/0271265 | A1 | 10/2013 | Finn |
| 2014/0267189 | A1 | 9/2014 | Moll et al. |
| 2014/0292678 | A1* | 10/2014 | Hayashi ............... G06F 3/0412 345/173 |
| 2014/0292687 | A1 | 10/2014 | Yamada et al. |

(Continued)

FOREIGN PATENT DOCUMENTS

| CN | 102682329 A | 9/2012 |
| KR | 20130084546 A | 7/2013 |

(Continued)

OTHER PUBLICATIONS

ISA European Patent Office, International Search Report and Written Opinion Issued in PCT Application No. PCT/US2017/030938, dated Jul. 11, 2017, WIPO, 12 Pages.

(Continued)

*Primary Examiner* — Aneeta Yodichkas
*Assistant Examiner* — Deeprose Subedi
(74) *Attorney, Agent, or Firm* — Alleman Hall Creasman & Tuttle LLP (57) ABSTRACT

A computing device including a capacitive touch screen and a processor configured to receive a capacitive image from the capacitive touch screen, determine that the capacitive image includes an image of a capacitive tag, identify a pattern of capacitive elements of the capacitive tag based on the capacitive image, determine bits of encoded data based on the identified pattern of capacitive elements, and process the encoded data.

20 Claims, 7 Drawing Sheets

(56) References Cited

U.S. PATENT DOCUMENTS

2015/0085179 A1* 3/2015 Van Heugten ..... H04N 5/23212
348/349
2015/0094621 A1 4/2015 Alberts et al.
2015/0265934 A1 9/2015 Taylor

FOREIGN PATENT DOCUMENTS

KR 101501491 B1 3/2015
WO 2015064827 A1 5/2015

OTHER PUBLICATIONS

Rekimoto, J., "SmartSkin: An Infrastructure for Freehand Manipulation on Interactive Surfaces", In Proceedings of be CHI Conference on Human Factors in Computing Systems, Apr. 20, 2002, Minneapolis, Minnesota, 8 pages.
Yu, et al., "Enabling Tangible Interaction on Capacitive Touch Panels", In Proceedings of the 23nd annual ACM symposium on User interface software and technology, Oct. 3, 2010, pp. 457-458.
Sample, et al., "A capacitive touch interface for passive RFID tags", In Proceedings of IEEE International Conference on RFID, Apr. 27, 2009, pp. 103-109.
"Tiggly", Retrieved on: Feb. 12, 2016 Available at: https://www.tiggly.com/.

\* cited by examiner

ENCODING DATA IN CAPACITIVE TAGS

BACKGROUND

Mobile computing devices with capacitive touch screens have become nearly ubiquitous in modern society. While such touch screens are designed to interact with the digits of a user, software programs have been developed by developers that can recognize a particular object placed on a touch screen by a distinguishable arrangement of capacitive tags that are placed on the object to identify it. These tags contact the touch screen and can be sensed by the capacitive sensor of the touch screen. To employ such an approach, for each object the developer has to conceive of a new arrangement of capacitive tags that will fit on the object and that will not be confused with another pre-defined arrangement of tags on a different object, apply the capacitive tags to the object in the new arrangement, and program the software to recognize the new arrangement of tags when placed on the screen. This process can be laborious and time intensive for the developer, and does not lend itself to systematization or cross-developer cooperation.

SUMMARY

To address the issues discussed above, a computing device for encoding data in capacitive tags is provided. The computing device comprising a capacitive touch screen, and a processor configured to receive a capacitive image from the capacitive touch screen, determine that the capacitive image includes an image of a capacitive tag, identify a pattern of capacitive elements of the capacitive tag based on the capacitive image, determine bits of encoded data based on the identified pattern of capacitive elements, and process the encoded data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
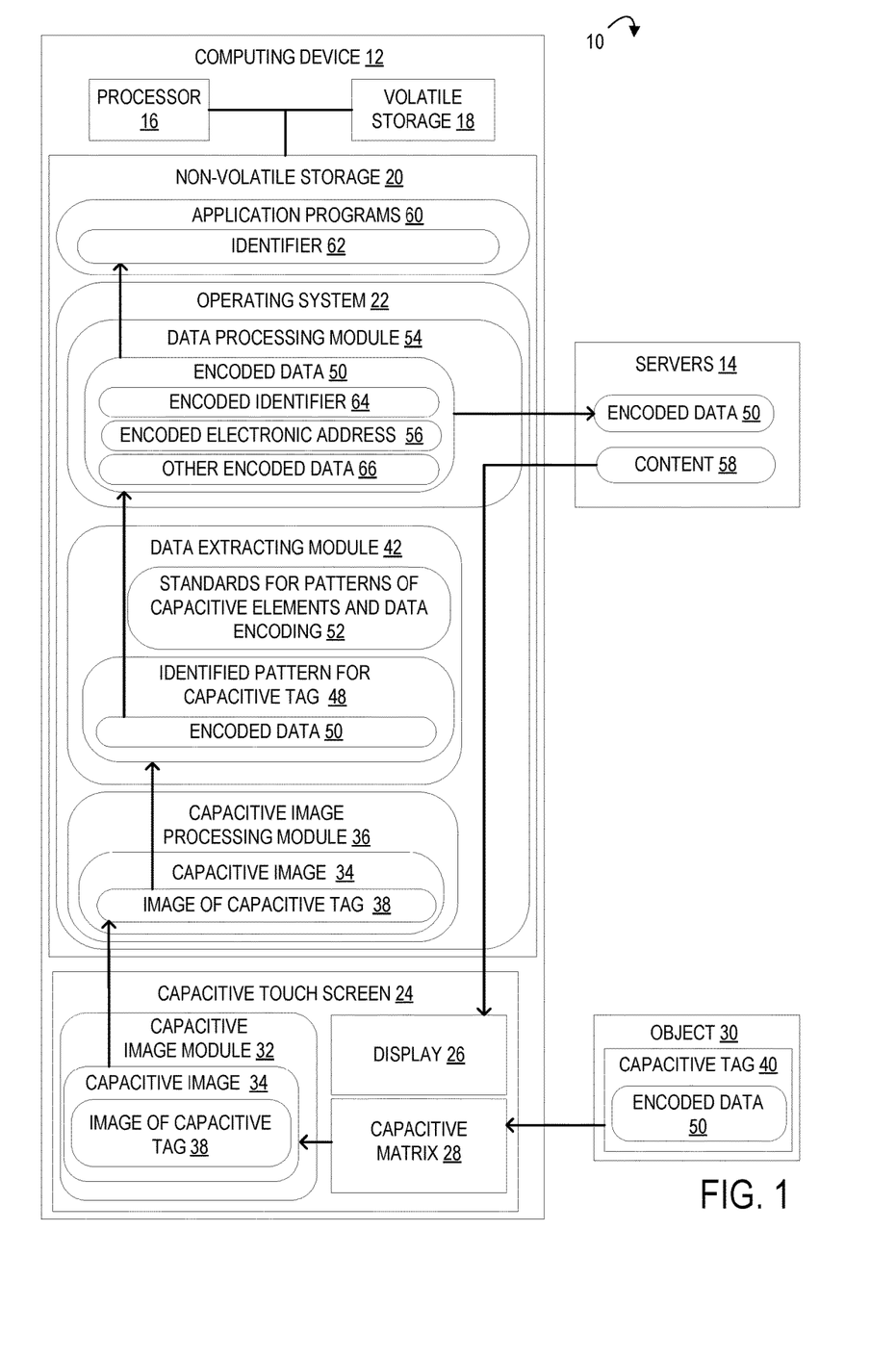
FIG. 1 shows an example computing system for encoding data in capacitive tags according to an embodiment of the present description.

FIG. 1 illustrates a computing system 10 according to one embodiment of the present disclosure. As shown, the computing system 10 includes a computing device 12, which, for example, may take the form of a mobile computing device, a tablet computing device, a desktop computing device, a laptop, etc. The computing device 12 is configured to communicate via a communication network with servers 14, which, for example, may take the form of single server devices or multiple server devices operating in cloud computing configurations.

Computing device 12 includes a processor 16, a volatile storage 18, and a non-volatile storage 20. The non-volatile storage 20 includes instructions for an operating system 22 executed by the processor 16. Computing device 12 further includes a capacitive touch screen 24, which, for example, may take the form of a capacitive touch screen display device separate from the computing device 12 in a desktop computing device embodiment, or may take the form of a capacitive touch screen display located in a housing containing both the capacitive touch screen display and the computing device 12 in a mobile computing device, tablet computing device, or laptop embodiment.

As illustrated in FIG. 1, the capacitive touch screen 24 includes a display 26 configured to display content received from the computing device 12. The capacitive touch screen 24 further includes a capacitive matrix 28 configured to detect changes in capacitance occurring from objects placed onto or near the capacitive touch screen 24, such as, for example, a user's finger or palm, a stylus, or an object 30. The changes in capacitance detected by the capacitive matrix 28 are received by a capacitive image module 32, which is configured to convert the changes in capacitance detected by the capacitive matrix 28 into a capacitive image 34. In one embodiment, the capacitive image module 32 is a program executed by a processor of the capacitive touch screen 24 separate from the processor 16 of the computing device 12. Alternatively, it will be appreciated that the functions of the capacitive image module 32 may be carried out by a system on chip (SoC), an integrated circuit, an application specific integrated circuit (ASIC), a field-programmable gate array (FPGA), or any other suitable processing device. In another embodiment, the functions of the capacitive image module 32 are executed by the processor 16 of the computing device 12.

The operating system 22 includes a capacitive image processing module 36 configured to receive a capacitive image 34 from the capacitive touch screen 24. The capacitive processing module 36 analyzes the capacitive image 34 to determine whether the capacitive image 34 includes an image 38 of a capacitive tag 40 being placed on or near the capacitive matrix 28. If the capacitive processing module 36 determined that the capacitive image 34 includes the image 38 of the capacitive tag 40, the capacitive image processing module 36 is configured to send the image 38 of the capacitive tag 40 to a data extracting module 42 of the operating system 22.

Figure 2:
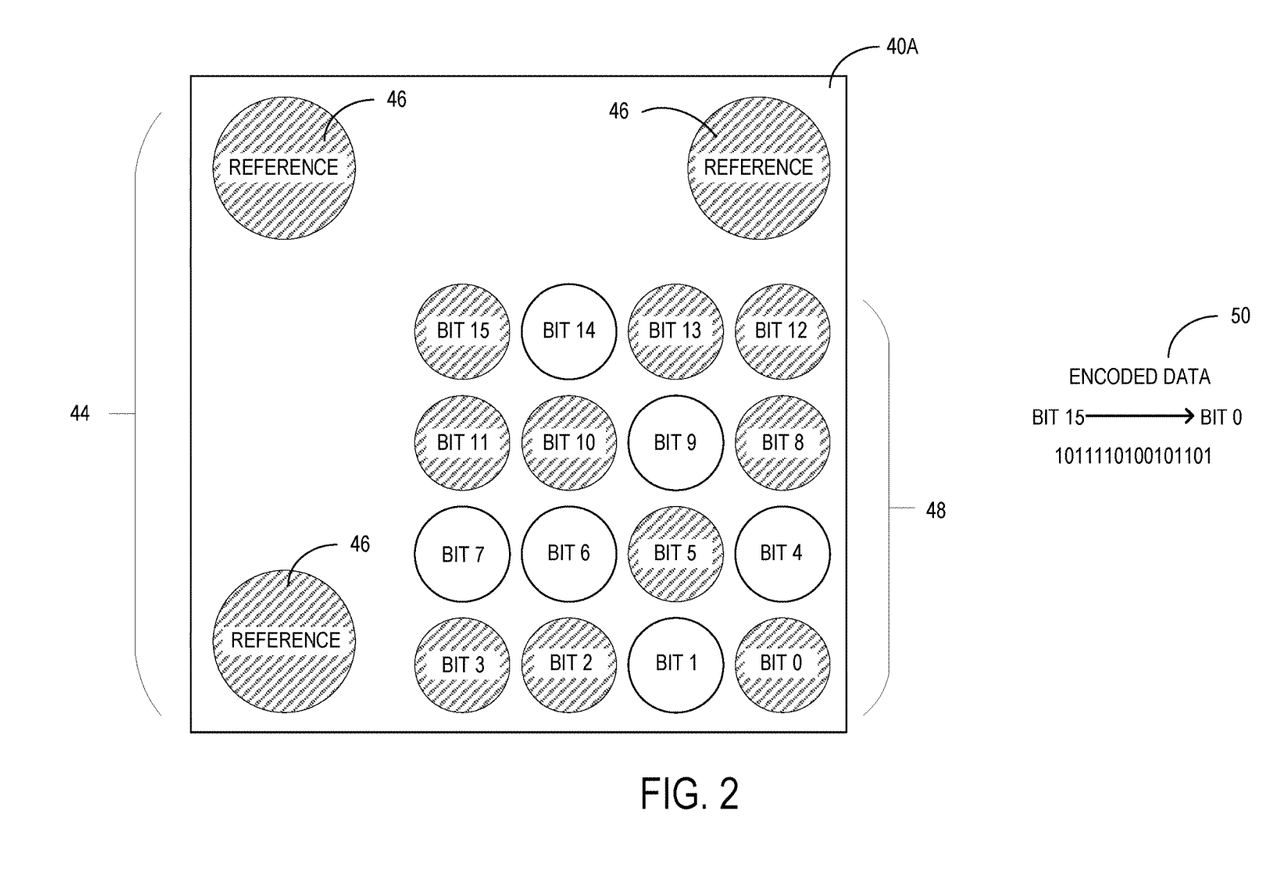
FIG. 2 shows an example capacitive tag for use with the computing system of FIG. 1.

Turning to FIG. 2, an example capacitive tag 40A is illustrated. In this specific embodiment, the example capacitive tag 40A includes a plurality of capacitive elements 44 comprising several reference capacitive elements 46 and a pattern of capacitive elements 48 in the form of a grid of capacitive elements. The pattern of capacitive elements 48 is configured to encode data based on a capacitance of each capacitive element in the pattern of capacitive elements 48. In the embodiment illustrated in FIG. 2, each capacitive element in the pattern of capacitive elements encodes a bit of data. For example, if, when placed on the display, a capacitive element is measured by capacitive sensors on the display to have a capacitance above a predetermined threshold, then it may be said to encode a bit of data having the value "1". On the other hand, if the capacitive element is not measured to have a capacitance above the predetermined threshold, then it may be said to encode a bit of data having a value "0". Thus, the grid of capacitive elements of the example capacitive tag 40A can encode sixteen bits of data.

Additionally, the capacitive elements of the grid of capacitive elements are ordered. As illustrated in FIG. 2, the top-left capacitive element in the grid of capacitive elements encodes bit 15, while the bottom-right capacitive element encodes bit 0. Thus, each capacitive element encodes a specific bit of the encoded data 50. Accordingly, in the illustrated example, capacitive tag 40A includes a grid pattern of sixteen ordered capacitive elements, each capacitive element encoding a specific bit of data in sixteen bits of encoded data. It will be appreciated that the above ordering method is merely illustrative, and that the methods of ordering the capacitive elements and corresponding bits of encoded data are not limited to the illustrated example.

Following the above pattern, the example capacitive tag 40A includes encoded data 50 having the sixteen bit value of "1011110100101101". Thus, with such a capacitive tag $2^{16}$ (65,536) values are possible. It will be appreciated that the example capacitive tag 40A is merely illustrative, and that the pattern of capacitive elements 48 is not limited to the shown four-by-four grid of capacitive elements. For example, the pattern of capacitive elements 40 may take the form of a three-by-three, five-by-five, or any other suitable dimension of a grid of capacitive elements. Further, it will be appreciated that the pattern of capacitive elements 48 is not limited to a grid pattern, but may take any suitable form to encode data, such as a circle, square, line, or other ordered arrangement of capacitive elements, etc. Alternative embodiments for the pattern of capacitive elements 48 will be discussed below.

Turning back to FIG. 1, the image 38 of the capacitive tag 40 is sent to the data extracting module 42 of the operating system 22. The data extracting module 42 is configured to compare the image 38 of the capacitive tag 40 against a database of standards for patterns of capacitive elements and data encoding 52. The standards are set for the operating system 22 such that third parties may manufacture capacitive tags 40 having encoded data 50 according to the standards recognized by the operating system 22. Thus, by comparing the image of the capacitive tag 40 of the object 30 placed on or near the capacitive matrix 28, the data extracting module 42 executed by the processor 16 is configured to identify a pattern of capacitive elements 48 of the capacitive tag 40 based on the capacitive image 34.

After identifying the pattern of capacitive elements 48, the data extracting module 42 is configured to determine bits of encoded data 50 based on the identified pattern of capacitive elements 48. For example, if the capacitive tag 40 on the object 30 is the example capacitive tag 40A of FIG. 2, then the data extracting module 42 is configured to recognize that the pattern of capacitive elements 48 is a grid of capacitive elements that encodes data via a capacitance of each capacitive element in the pattern of capacitive elements. Accordingly, because the identified pattern of capacitive elements 48 encodes data via capacitance, the processor 16 is configured to determine a capacitance for each capacitive element in the pattern of capacitive elements based on the capacitive image 34, and determine bits of encoded data 50 based on the determined capacitance of each capacitive element in the pattern of capacitive elements. As discussed above, the pattern of capacitive elements is not limited to a grid, but may also take other suitable forms such as a circle, square, line or other ordered pattern that also encodes data via a capacitance of each capacitive element in the pattern of capacitive elements. In the illustrated embodiment of a capacitive tag in FIG. 2, each capacitive element in the grid of capacitive elements encodes a bit of data such that a capacitive element not having a detected threshold capacitance encodes the value "0" and a capacitive element having a detected threshold capacitance encodes the value "1". Accordingly, in this embodiment, the data extracting module 42 is configured to determine the encoded bit for each capacitive element based on whether that capacitive element has a threshold capacitance or does not have a threshold capacitance. Thus, as illustrated in FIG. 2, the data extracting module 42 extracts the encoded data 50 having the sixteen bit value of "1011110100101101".

Next, after extracting the encoded data 50 as described above, the data extracting module 42 is configured to send the encoded data 50 to a data processing module 54 of the operating system 22. The data processing module 54 is configured to process the encoded data 50. In one embodiment, to process the encoded data, the data processing module 54 is configured to determine an electronic address for a server 14 based on the encoded data 50. For example, the encoded data may include an encoded electronic address 56 for a server 14. The encoded electronic address may take a form of an Internet Protocol (IP) address, an identifier to look up the address for the server, or any other suitable method of storing an electronic address for a server in the encoded data 50. After determining the electronic address, the data processing module 54 is configured to send the encoded data 50 to the server 14 specified by the electronic address, receive content 58 from the server 14 based on the encoded data 50, and present the content 58 on the capacitive touch screen 24. For example, the content may include an image, text, sound, or any other type of content suitable to be presented via the computing device 12.

In one embodiment, the processor 16 is configured to execute a plurality of application programs 60, each application program 60 including an associated identifier 62 recognized by the operating system 22. In one specific example, the developer for each application program 60 may register an identifier 62 with the manufacturer of the computing device 12 or the operating system 22. Accordingly, the identifier 62 for an application program 60 may be encoded in the capacitive tag 40. Thus, the developer of a particular application program 60 may manufacture a capacitive tag 40 having encoded data 50 that includes an encoded identifier 64 for that particular developer's application program 60 and other encoded data 66 that is usable by that application program to perform a desired function. For example, the other encoded data 66 may specify certain content of that application program 60 that is to be presented via the computing device 12. However, it will be appreciated that the other encoded data 66 may include any suitable type of data, such as other identifiers, associated information for the object 30 attached to the capacitive tag 40 such as object type, size, manufacturer, color, etc. In this way, after receiving the encoded data 50, the data processing module 54 is configured to determine an identifier 62 for an application program 60 based on the encoded data 50, determine an application program 60 associated with the encoded identifier 64, and send the encoded data 50 to the determined application program 60.

Figure 3:
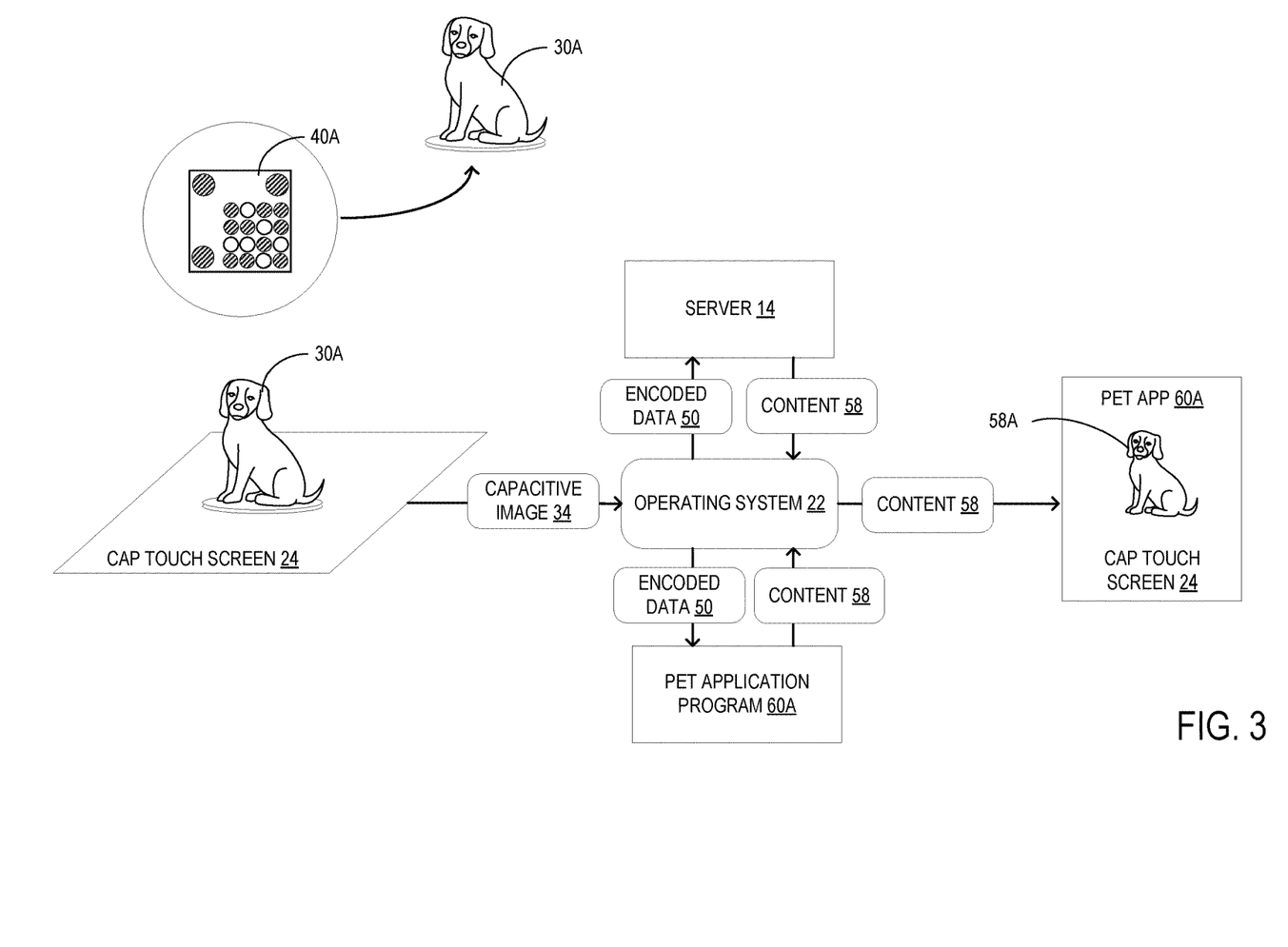
FIG. 3 shows an example object and capacitive tag for use with the computing system of FIG. 1.

Now turning to FIG. 3, an example computing device 12 is executing an example application program 60 called the Pet Application Program 60A. The developer of the Pet Application Program 60A has also manufactured an example object 30, which is a Pet Dog Object 30A. As illustrated, the Pet Dog Object 30A includes an attached example capacitive tag 40A. Thus, when a user of the computing device 12 places the Pet Dog Object 30A onto the capacitive touch screen 24, a capacitive image 34 including an image of the example capacitive tag 40A is sent to the operating system 22 of the computing device 12. Next, encoded data 50 of the example capacitive data 40A is extracted according to the methods described above. If the encoded data 50 includes an encoded electronic address 56 for a server 14 associated with the Pet Application Program 60A, then the operating system 22 sends the encoded data 50 to that server. The operating system 22 then presents any content 58 received from that server on the capacitive touch screen 24 or through any output device suitable for the content 58 such as speakers if the content 58 includes audio content. In the illustrated example, the content 58 is an image 58A of the Pet Dog Object that is displayed on the capacitive touch screen 24 in the Pet Application Program 60A executed on the computing device 12.

On the other hand, if the encoded data includes an encoded identifier 64 for the Pet. Application Program 60A, the operating system 22 sends the encoded data 50 to the Pet Application Program and similarly presents any content of the Pet Application Program resulting from the encoded data 50, such as the image 58A of the Pet Dog Object, on the capacitive touch screen 24 of the computing device 12. It will be appreciated that these specific examples are merely illustrative, and that other types of content 58 and other encoded data 66 specifically not discussed above may also be utilized. In particular, it will be appreciated that processing the encoded data 50 may not necessarily result in content being presented to the user. For example, the other encoded data 66 in the encoded data 50 may include a password to unlock features of the operating system 22 or application programs 60 executed on the computing device 12. As another example, the encoded data 50 may include a key to allow the operating system 22 to download an application program 60 to be executed on the computing device 12. As yet another example, the encoded data 50 may include data that affects or is used by background processes of the operating system 22 or application programs 60 and may not result in immediate content 58 being presented to a user of the computing device 12.

Figure 4:
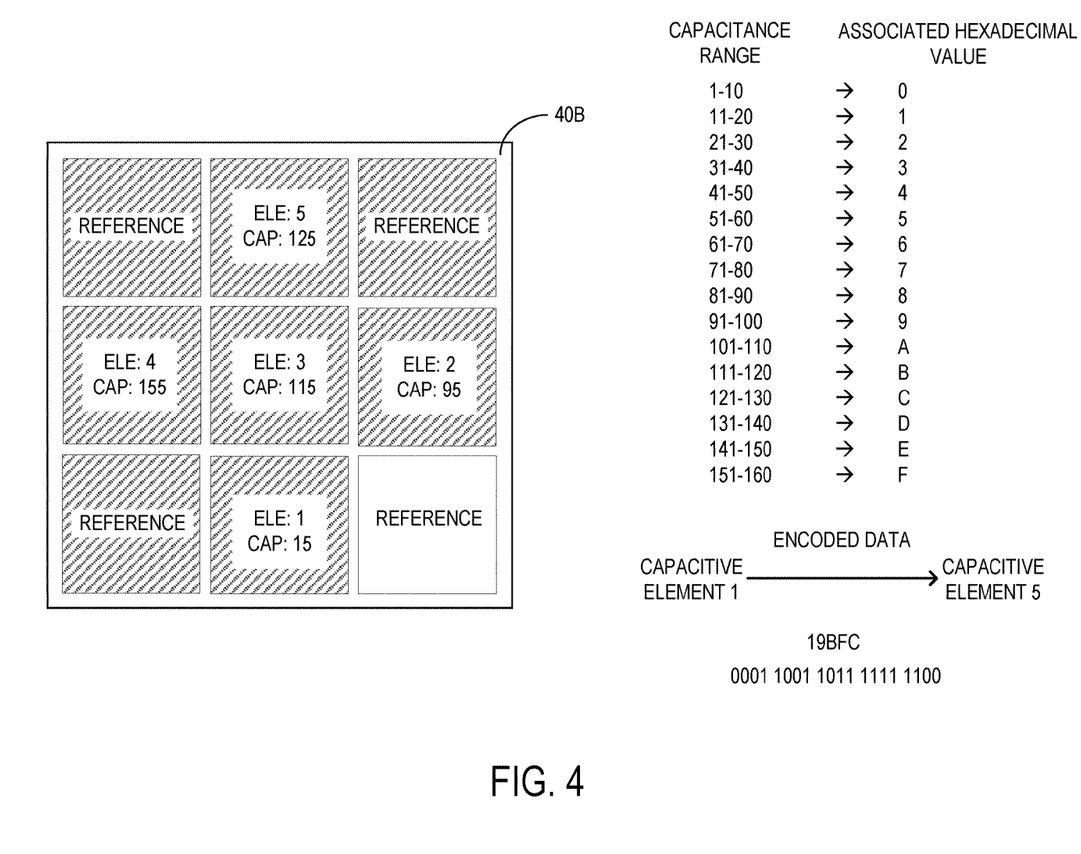
FIG. 4 shows another example capacitive tag for use with the computing system of FIG. 1.

Now turning to FIG. 4, another embodiment of the capacitive tag 40 discussed above is illustrated. In this embodiment, a second example capacitive tag 40B includes a grid of capacitive elements. However, in contrast to the example capacitive tag 40A shown in FIG. 2, the second example capacitive tag 40B includes square capacitive elements rather than the circular capacitive elements of the example capacitive tag 40A. Further, the reference capacitive elements of the second example capacitive tag 40B are located within the grid of capacitive elements. In this way, the second example capacitive tag 40B provides a more compact capacitive tag that may be suitable for attachment to small objects.

Additionally, in the embodiment illustrated in FIG. 4, each capacitive element in the pattern of capacitive elements encodes a plurality of bits of data. As shown, the capacitive elements in this embodiment may have a plurality of levels of capacitance. In this particular example, there are sixteen levels of capacitance that the capacitive elements may have, denoted by hexadecimal values 1 through F. Each hexadecimal value is associated with a different capacitance or a different range of capacitances, such as, for example, 1-10 microfarad, 11-20 microfarad, 21-30 microfarad, etc. Thus, in this embodiment, after an object 30 having the second example capacitive tag 40B is placed on the capacitive touch screen 24, the processor 16 is configured to determine the encoded plurality of bits of data for each capacitive element based on a corresponding amount of capacitance determined for that capacitive element.

As shown in FIG. 4, the capacitive matrix 28 detects that capacitive element 1 has a capacitance of 15 microfarads, capacitive element 2 has a capacitance of 95 microfarads, capacitive elements 3 has a capacitance of 115 microfarads, capacitive elements 4 has a capacitance of 155 microfarads, and capacitive elements 5 has a capacitance of 125 microfarads. Accordingly, to extract the encoded data 50, the processor is configured to convert the detected capacitances of each capacitive element to the corresponding hexadecimal value. As shown in FIG. 4, the second example capacitive tag 40B has encoded data 50 having the hexadecimal value of "19BFC", which has a binary value of "00011001101111111100". This encoded data 50 may then be processed by the operating system 22 according to the methods discussed above.

Figure 5:
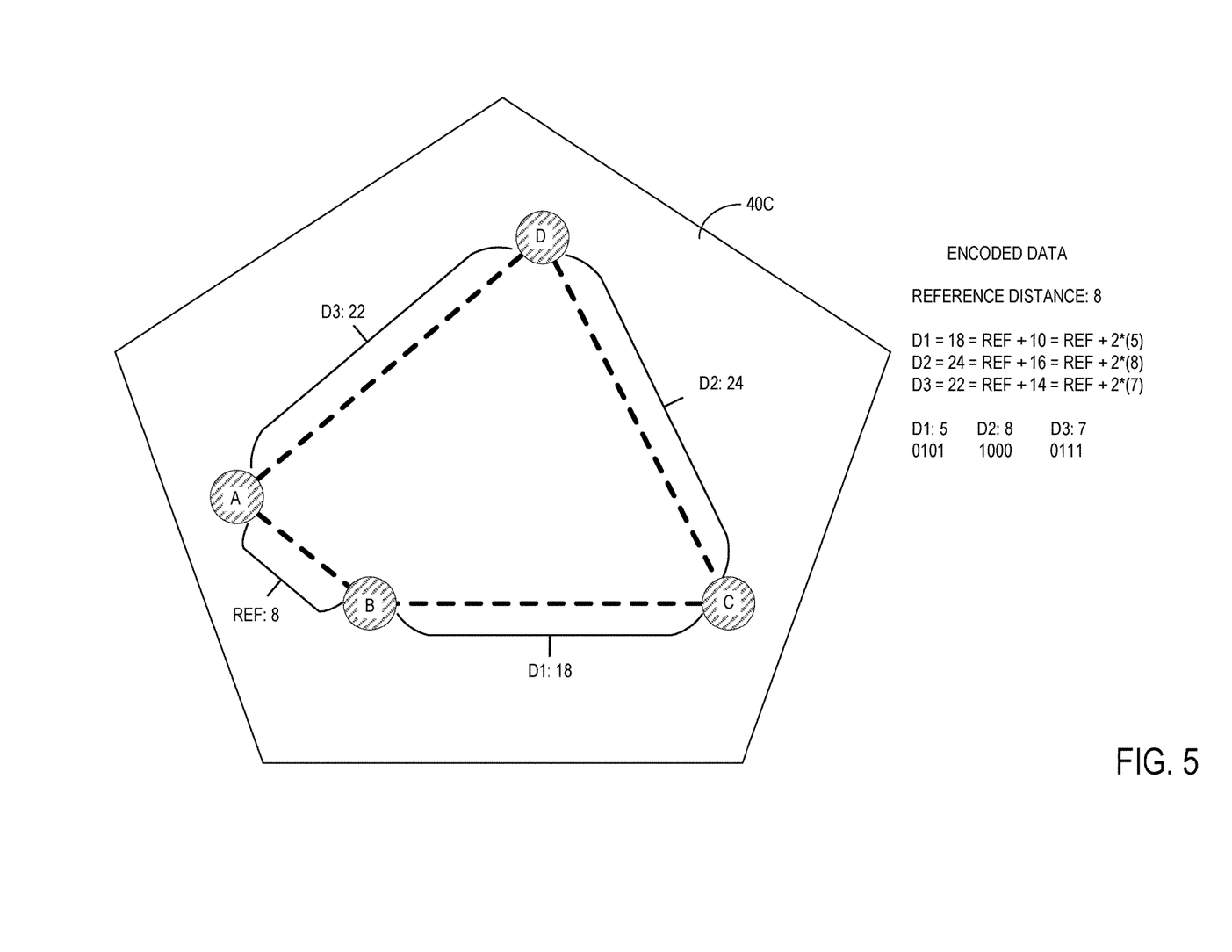
FIG. 5 shows yet another example capacitive tag for use with the computing system of FIG. 1.

Now turning to FIG. 5, yet another embodiment of the capacitive tag 40 discussed above is illustrated. In this embodiment, a third example capacitive tag 40C includes a pattern of capacitive elements that is not a grid of capacitive elements. As shown, the pattern of capacitive elements includes a plurality of capacitive elements, each capacitive element located at a predetermined distance from another capacitive element in the plurality of capacitive elements. In the illustrated example, the pattern of capacitive elements includes four capacitive elements A, B, C, and D. Capacitive element A is located at a reference distance of 8 mm from capacitive element B. Capacitive element B is located at an example distance D1 of 18 mm from capacitive element C. Capacitive element C is located at an example distance D2 of 24 mm from capacitive element D. And finally, capacitive element D is located at an example distance D3 of 22 mm from capacitive element A.

In this embodiment, the values of the distances between the capacitive elements D1-D3 may encode the encoded data 50. Thus, to determine bits of encoded data 50, the data extracting module 42 is configured to determine a distance between a first capacitive element and a second capacitive element based on the capacitive image 34, and determine bits of encoded data based on the distance between the first capacitive element and the second capacitive element. In the example illustrated in FIG. 5, the encoded data 50 is extracted by subtracting the reference distance from one of the distances D1, D2, and D3, dividing the result by 2, and converting to a binary value. Accordingly, subtracting the reference distance of 8 from the distance D1 of 18 results in the value 10. Dividing 10 by 2 yields 5, which, when converted to a binary value, results in the value "0101".

Additionally, the distances D1, D2, and D3 are ordered, each distance encoding specific bits of the encoded data 50. In the illustrated embodiment, the distance are ordered in a counter-clockwise fashion starting at the reference distance. Thus, because the reference distance of 8 mm is between capacitive elements A and B, by following the counter-clockwise order of the capacitive elements, the distance D1 is between capacitive elements B and C, the distance D2 is between capacitive elements C and D, and the distance D3 is between capacitive elements D and A. It will be appreciated that the above ordering method is merely illustrative, and the methods of ordering capacitive elements and distances for encoding data is not limited to the shown example.

Following this method for the distances D2 and D3, and combining the results for D1 through D3, the encoded data 50 of "010110000111" is extracted from the third example capacitive tag 40C. It will be appreciated that the above calculation methods are merely illustrative, and that other methods of encoding data via distances between capacitive elements is not limited to the shown example.

Figure 6:
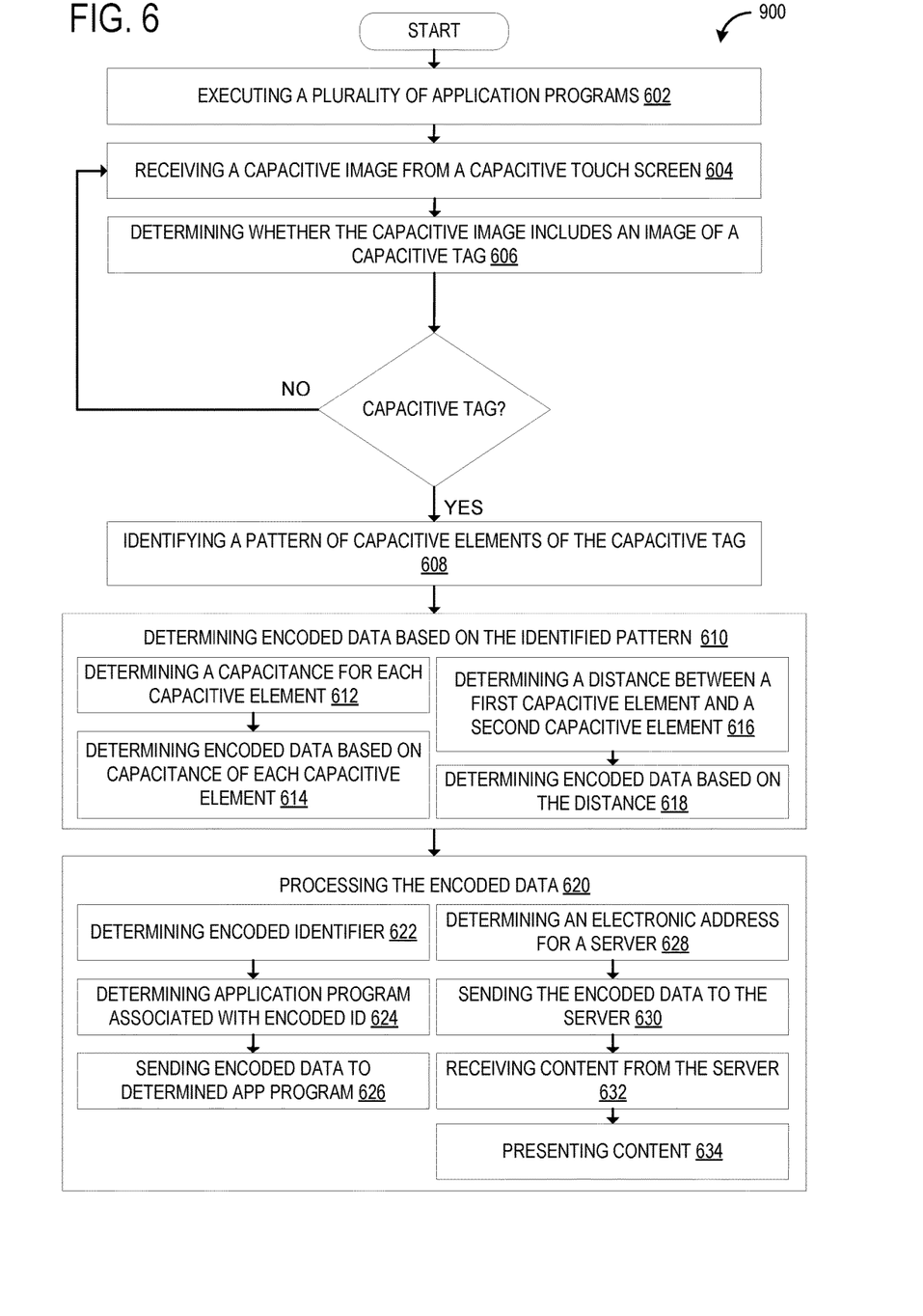
FIG. 6 shows an example method for encoding data in capacitive tags using the computing system of FIG. 1.

FIG. 6 shows an example method 600 according to an embodiment of the present description. At step 602, the method 600 may include executing a plurality of application programs, each application program including an associated identifier. Advancing from step 602 to step 604, the method 600 may include receiving a capacitive image from a capacitive touch screen. The capacitive image may include a plurality of touch points indicated by changes in capacitance detected by a capacitive matrix. Proceeding from step 604 to step 606, the method 600 may include determining whether the capacitive image includes an image of a capacitive tag. The capacitive tag may be attached to an object that is placed on or near the capacitive touch screen. If the capacitive image does not include the image of the capacitive tag, the method 600 may proceed back to step 604 when a new capacitive image is received from the capacitive touch screen.

On the other hand, if the capacitive image includes the image of the capacitive tag, the method 600 proceeds to step 608 and may include identifying a pattern of capacitive elements of the capacitive tag based the capacitive image. The pattern of capacitive elements may be identified as being one of a plurality of recognized patterns of capacitive elements known to the computing device 12 according to the standards for patterns of capacitive elements and data encoding 52 stored by the computing device 12. Advancing from step 608 to step 610, the method 600 may include determining bits of encoded data based on the identified pattern of capacitive elements. In one embodiment, the pattern of capacitive elements is a grid of capacitive elements. Of course, it will be appreciated that alternatively a pattern other than a grid may be utilized, as discussed above.

In one embodiment, the identified pattern of capacitive elements encodes data via a capacitance of each capacitive element in the pattern of capacitive elements. In this embodiment, the method 600 proceeds from step 610 to substep 612 and may include determining a capacitance for each capacitive element in the pattern of capacitive elements based on the capacitive image.

Advancing from substep 612 to substep 614, the method 600 may include determining bits of encoded data based on the determined capacitance of each capacitive element. As discussed above the capacitive elements may be arranged in a grid, and each capacitive element in the grid of capacitive elements may encode a bit of data. Of course, it will be appreciated that the pattern of capacitive elements may be arranged in forms other than a grid, and each capacitive element in the pattern of capacitive elements may encode a bit of data. At substep 614, the method may further include determining the encoded bit for each capacitive element based on whether that capacitive element has a threshold capacitance or does not have a threshold capacitance. In another embodiment, each capacitive element in the pattern of capacitive elements encodes a plurality of bits of data, and substep 614 further comprises determining the encoded plurality of bits of data for each capacitive element based on a corresponding amount of capacitance determined for that capacitive element.

On the other hand, in another embodiment, if the pattern of capacitive elements includes a plurality of capacitive elements, each capacitive element located at a predetermined distance from another capacitive element in the plurality of capacitive elements, the method 600 proceeds from step 610 to substep 616 and may include determining a distance between a first capacitive element and a second capacitive element based on the capacitive image. Advancing from substep 616 to substep 618, the method 600 may include determining bits of encoded data based on the distance between the first capacitive element and the second capacitive element.

Proceeding from step 610 to step 620, the method 600 may include processing the encoded data. In one embodiment, if the encoded data include an encoded identifier associated with an application program, the method advances from step 620 to substep 622 and may include determining an encoded identifier based on the encoded data. The method 600 proceeds from substep 622 to substep 624 and may include determining an application program associated with the encoded identifier. Advancing from substep 624 to substep 626, the method 600 may include sending the encoded data to the determined application program.

In another embodiment, if the encoded data includes an electronic address for a server, the method 600 proceeds from step 620 to substep 628 and may include determining an electronic address for a server based on the encoded data. Advancing from substep 628 to substep 630, the method 600 may include sending the encoded data to the server. Proceeding from substep 630 to substep 632, the method 600 may include receiving content from the server based on the encoded data. Advancing from substep 632 to substep 634, the method 600 may include presenting the content on the capacitive touch screen.

It will be appreciated that the method steps described above may be performed using the algorithmic processes described throughout this disclosure, including in the description of the computing system 10 above.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
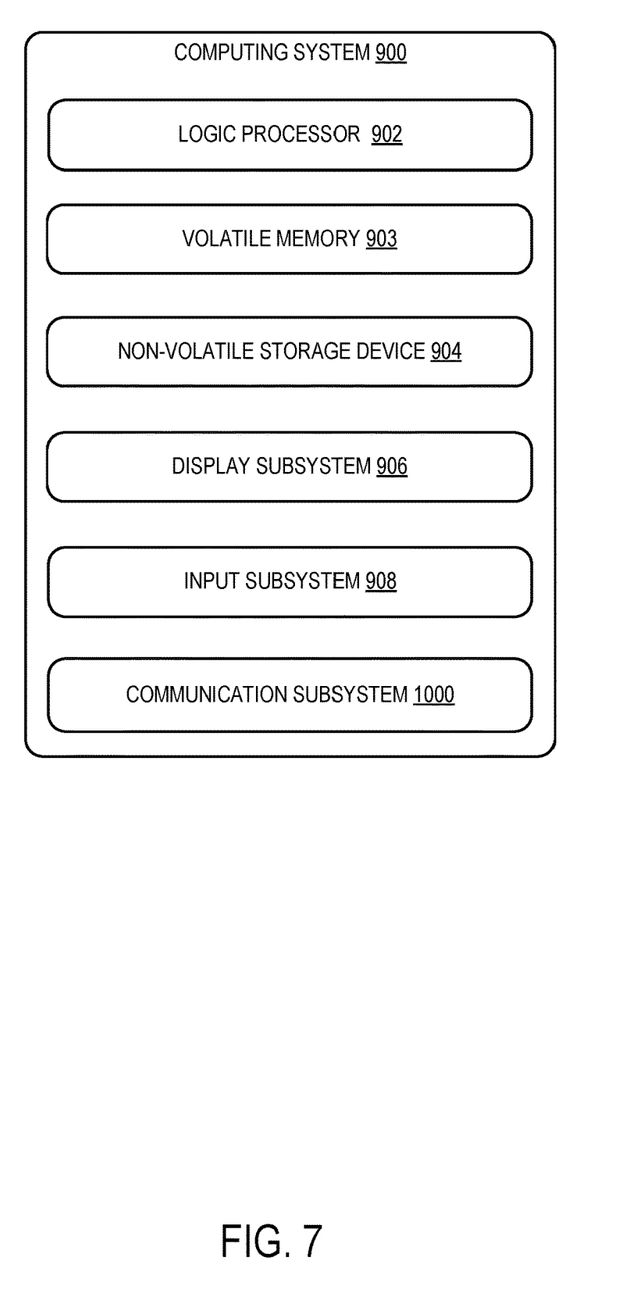
FIG. 7 shows an example computing system according to an embodiment of the present description.

FIG. 7 schematically shows a non-limiting embodiment of a computing system 900 that can enact one or more of the methods and processes described above. Computing system 900 is shown in simplified form. Computing system 900 may embody the computing device 12. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 903, and a non-volatile storage device 904. Computing system 900 may optionally include a display subsystem 906, input subsystem 908, communication subsystem 1000, and/or other components not shown in FIG. 7. The display subsystem 906 and input subsystem 908 may include the capacitive touch screen 24, including the display 26 and the capacitive matrix 28.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 904 includes one or more physical devices configured to hold instructions executable by the logic processors to implement the methods and processes described herein. When such methods and processes are implemented, the state of non-volatile storage device 94 may be transformed—e.g., to hold different data.

Non-volatile storage device 904 may include physical devices that are removable and/or built-in. Non-volatile storage device 94 may include optical memory (e.g., CD, DVD, HD-DVD, Blu-Ray Disc, etc.), semiconductor memory (e.g., ROM, EPROM, EEPROM. FLASH memory, etc.), and/or magnetic memory (e.g., hard-disk drive, floppy-disk drive, tape drive, MRAM, etc.), or other mass storage device technology. Non-volatile storage device 904 may include nonvolatile, dynamic, static, read/write, read-only, sequential-access, location-addressable, file-addressable, and/or content-addressable devices. It will be appreciated that non-volatile storage device 904 is configured to hold instructions even when power is cut to the non-volatile storage device 904.

Volatile memory 903 may include physical devices that include random access memory. Volatile memory 903 is typically utilized by logic processor 902 to temporarily store information during processing of software instructions. It will be appreciated that volatile memory 903 typically does not continue to store instructions when power is cut to the volatile memory 903.

Aspects of logic processor 902, volatile memory 903, and non-volatile storage device 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 904, using portions of volatile memory 903. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 906 may be used to present a visual representation of data held by non-volatile storage device 904. The visual representation may take the form of a graphical user interface (GUI). As the herein described methods and processes change the data held by the non-volatile storage device, and thus transform the state of the non-volatile storage device, the state of display subsystem 906 may likewise be transformed to visually represent changes in the underlying data. Display subsystem 906 may include one or more display devices utilizing virtually any type of technology. Such display devices may be combined with logic processor 902, volatile memory 903, and/or non-volatile storage device 904 in a shared enclosure, or such display devices may be peripheral display devices.

When included, input subsystem 908 may comprise or interface with one or more user-input devices such as a keyboard, mouse, touch screen, microphone, camera, or game controller.

When included, communication subsystem 1000 may be configured to communicatively couple various computing devices described herein with each other, and with other devices. Communication subsystem 1000 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

The following paragraphs provide additional support for the claims of the subject application. One aspect provides a computing device comprising a capacitive touch screen, and a processor configured to receive a capacitive image from the capacitive touch screen, determine that the capacitive image includes an image of a capacitive tag, identify a pattern of capacitive elements of the capacitive tag based on the capacitive image, determine bits of encoded data based on the identified pattern of capacitive elements, and process the encoded data. In this aspect, additionally or alternatively, the pattern of capacitive elements may be a grid of capacitive elements. In this aspect, additionally or alternatively to determine bits of encoded data, the processor may be configured to determine a capacitance for each capacitive element in the pattern of capacitive elements based on the capacitive image, and determine bits of encoded data based on the determined capacitance of each capacitive element in the pattern of capacitive elements. In this aspect, additionally or alternatively, each capacitive element in the pattern of capacitive elements may encodes a bit of data, and the processor may be configured to determine the encoded bit for each capacitive element based on whether that capacitive element has a threshold capacitance or does not have a threshold capacitance. In this aspect, additionally or alternatively, each capacitive element in the pattern of capacitive elements may encode a plurality of bits of data, and the processor may be configured to determine the plurality of bits of data for each capacitive element based on a corresponding amount of capacitance determined for that capacitive element. In this aspect, additionally or alternatively, the pattern of capacitive elements may include a plurality of capacitive elements, each capacitive element located at a predetermined distance from another capacitive element in the plurality of capacitive elements. In this aspect, additionally or alternatively, to determine bits of encoded data, the processor may be configured to determine a distance between a first capacitive element and a second capacitive element based on the capacitive image, and determine bits of encoded data based on the distance between the first capacitive element and the second capacitive element. In this aspect, additionally or alternatively, the processor may be configured to execute a plurality of application programs, each application program including an associated identifier, and to process the encoded data, the processor may be further configured to determine an encoded identifier for an application program based on the encoded data, determine an application program associated with the encoded identifier, and send the encoded data to the determined application program. In this aspect, additionally or alternatively, to process the encoded data, the processor may be further configured to: determine an electronic address for a server based on the encoded data, send the encoded data to the server, receive content from the server based on the encoded data, and present the content on the capacitive touch screen.

Another aspect provides a method comprising receiving a capacitive image from a capacitive touch screen, determining that the capacitive image includes an image of a capacitive tag, identifying a pattern of capacitive elements of the capacitive tag based the capacitive image, determining bits of encoded data based on the identified pattern of capacitive elements, and processing the encoded data. In this aspect, additionally or alternatively, the pattern of capacitive elements may be a grid of capacitive elements. In this aspect, additionally or alternatively, determining bits of encoded data may further comprise determining a capacitance for each capacitive element in the pattern of capacitive elements based on the capacitive image, and determining bits of encoded data based on the determined capacitance of each capacitive element in the pattern of capacitive elements. In this aspect, additionally or alternatively, each capacitive element in the pattern of capacitive elements may encode a bit of data, and the method may further comprise determining the encoded bit for each capacitive element based on whether that capacitive element has a threshold capacitance or does not have a threshold capacitance. In this aspect, additionally or alternatively, each capacitive element in the pattern of capacitive elements may encode a plurality of bits of data, and wherein the method may further comprise determining the encoded plurality of bits of data for each capacitive element based on a corresponding amount of capacitance determined for that capacitive element. In this aspect, additionally or alternatively, the pattern of capacitive elements may include a plurality of capacitive elements, each capacitive element located at a predetermined distance from another capacitive element in the plurality of capacitive elements. In this aspect, additionally or alternatively, determining bits of encoded data may further comprise determining a distance between a first capacitive element and a second capacitive element based on the capacitive image, and determining bits of encoded data based on the distance between the first capacitive element and the second capacitive element. In this aspect, the method may additionally or alternatively include, executing a plurality of application programs, each application program including an associated identifier, and processing the encoded data may further comprises determining an encoded identifier based on the encoded data, determining an application program associated with the encoded identifier, and sending the encoded data to the determined application program. In this aspect, additionally or alternatively, processing the encoded data may further comprise determining an electronic address for a server based on the encoded data, sending the encoded data to the server, receiving content from the server based on the encoded data, and presenting the content on the capacitive touch screen.

Another aspect provides a computing device comprising an operating system executed by a processor, the operating system including: a capacitive image processing module configured to receive a capacitive image from a capacitive touch screen, and determine that the capacitive image includes an image of a capacitive tag, a data extracting module configured to identify a pattern of capacitive elements of the capacitive tag based on the capacitive image, and determine bits of encoded data based on the identified pattern of capacitive elements, and a data processing module configured to process the encoded data. In this aspect, additionally or alternatively, the data processing module may be further configured to determine an electronic address for a server based on the encoded data, send the encoded data to the server, receive content from the server based on the encoded data, and present the content to a user of the computing device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing device comprising:
   a capacitive touch screen configured to detect changes in capacitance occurring from interaction with a physical object placed onto or near the capacitive touch screen; and
   a processor configured to:
      receive a capacitive image from the capacitive touch screen;
      determine, based on the capacitive image, that the physical object includes a capacitive tag having a pattern of capacitive elements, wherein the pattern of capacitive elements is a spatial pattern that encodes a plurality of bits of data in different regions of an area of the capacitive tag to be read concurrently by capacitive sensors of the capacitive touch screen;
      identify the pattern of capacitive elements of the capacitive tag based on the capacitive image;
      determine the plurality of bits of data encoded by the identified pattern of capacitive elements; and
      process the encoded data.

2. The computing device of claim 1, wherein the pattern of capacitive elements is a grid of capacitive elements.

3. The computing device of claim 1, wherein to determine bits of encoded data, the processor is configured to:
  determine a capacitance for each capacitive element in the pattern of capacitive elements based on the capacitive image; and
  determine bits of encoded data based on the determined capacitance of each capacitive element in the pattern of capacitive elements.

4. The computing device of claim 3, wherein each capacitive element in the pattern of capacitive elements encodes a bit of data; and wherein
  the processor is configured to determine the encoded bit for each capacitive element based on whether that capacitive element has a threshold capacitance or does not have a threshold capacitance.

5. The computing device of claim 3, wherein each capacitive element in the pattern of capacitive elements encodes a plurality of bits of data; and wherein
  the processor is configured to determine the plurality of bits of data for each capacitive element based on a corresponding amount of capacitance determined for that capacitive element.

6. The computing device of claim 1, wherein the pattern of capacitive elements includes a plurality of capacitive elements, each capacitive element located at a predetermined distance from another capacitive element in the plurality of capacitive elements.

7. The computing device of claim 1, wherein to determine bits of encoded data, the processor is configured to:
  determine a distance between a first capacitive element and a second capacitive element based on the capacitive image; and
  determine bits of encoded data based on the distance between the first capacitive element and the second capacitive element.

8. The computing device of claim 1, wherein the processor is configured to execute a plurality of application programs, each application program including an associated identifier; and
  wherein to process the encoded data, the processor is further configured to:
    determine an encoded identifier for an application program based on the encoded data;
    determine an application program associated with the encoded identifier; and
    send the encoded data to the determined application program.

9. The computing device of claim 1, wherein to process the encoded data, the processor is further configured to:
  determine an electronic address for a server based on the encoded data;
  send the encoded data to the server;
  receive content from the server based on the encoded data; and
  present the content on the capacitive touch screen.

10. A method comprising:
  detecting changes in capacitance occurring from interaction with a physical object placed onto or near a capacitive touch screen;
  receiving a capacitive image from the capacitive touch screen;
  determining, based on the capacitive image, that the physical object includes a capacitive tag having a pattern of capacitive elements, wherein the pattern of capacitive elements is a spatial pattern that encodes a plurality of bits of data in different regions of an area of the capacitive tag to be read concurrently by capacitive sensors of the capacitive touch screen;
  identifying the pattern of capacitive elements of the capacitive tag based the capacitive image;
  determining the plurality of bits of data encoded by the identified pattern of capacitive elements; and
  processing the encoded data.

11. The method of claim 10, wherein the pattern of capacitive elements is a grid of capacitive elements.

12. The method of claim 10, wherein determining bits of encoded data further comprises:
  determining a capacitance for each capacitive element in the pattern of capacitive elements based on the capacitive image; and
  determining bits of encoded data based on the determined capacitance of each capacitive element in the pattern of capacitive elements.

13. The method of claim 12, wherein each capacitive element in the pattern of capacitive elements encodes a bit of data; and wherein
  the method further comprises determining the encoded bit for each capacitive element based on whether that capacitive element has a threshold capacitance or does not have a threshold capacitance.

14. The method of claim 12, wherein each capacitive element in the pattern of capacitive elements encodes a plurality of bits of data; and wherein
  the method further comprises determining the encoded plurality of bits of data for each capacitive element based on a corresponding amount of capacitance determined for that capacitive element.

15. The method of claim 10, wherein the pattern of capacitive elements includes a plurality of capacitive elements, each capacitive element located at a predetermined distance from another capacitive element in the plurality of capacitive elements.

16. The method of claim 10, wherein determining bits of encoded data further comprises:
  determining a distance between a first capacitive element and a second capacitive element based on the capacitive image; and
  determining bits of encoded data based on the distance between the first capacitive element and the second capacitive element.

17. The method of claim 10, further comprising:
  executing a plurality of application programs, each application program including an associated identifier; and
  wherein processing the encoded data further comprises:
    determining an encoded identifier based on the encoded data;
    determining an application program associated with the encoded identifier; and
    sending the encoded data to the determined application program.

18. The method of claim 10, wherein processing the encoded data further comprises:
  determining an electronic address for a server based on the encoded data;
  sending the encoded data to the server;
  receiving content from the server based on the encoded data; and
  presenting the content on the capacitive touch screen.

19. A computing device comprising:
  an operating system executed by a processor, the operating system being configured to:
    receive a capacitive image from a capacitive touch screen configured to detect changes in capacitance occurring from interaction with a physical object placed onto or near the capacitive touch screen;

determine, based on the capacitive image, that the physical object includes a capacitive tag having a pattern of capacitive elements, wherein the pattern of capacitive elements is a spatial pattern that encodes a plurality of bits of data in different regions of an area of the capacitive tag to be read concurrently by capacitive sensors of the capacitive touch screen;

identify the pattern of capacitive elements of the capacitive tag based on the capacitive image, and determine the the plurality of bits of data encoded by the identified pattern of capacitive elements; and process the encoded data.

20. The computing device of claim 19, wherein the operating system is further configured to:

determine an electronic address for a server based on the encoded data;

send the encoded data to the server;

receive content from the server based on the encoded data; and present the content to a user of the computing device.

* * * * *